Figure 1:
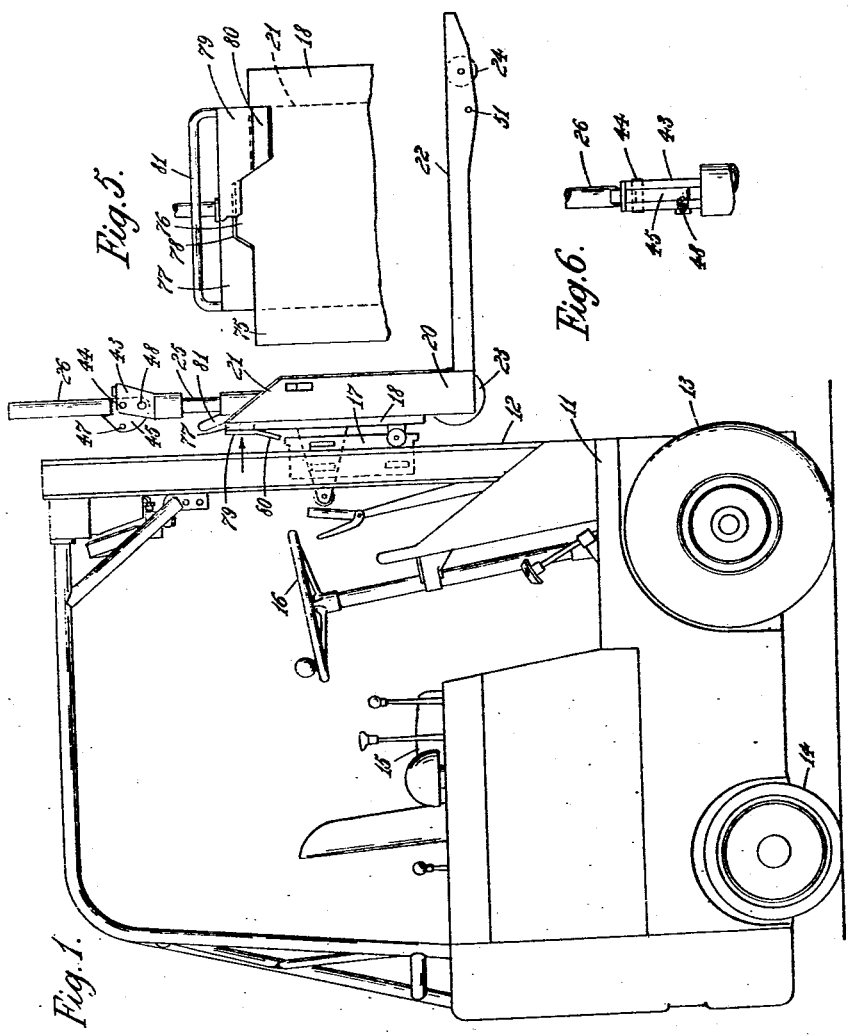

United States Patent Office 2,796,186
Patented June 18, 1957

2,796,186

PALLET AND LIKE TRUCKS

Alfred Erwin Reginald Arnot, Basingstoke, England, assignor to Emmanuel Kaye and John Reginald Sharp, Basingstoke, England Application December 15, 1955, Serial No. 553,354

12 Claims. (Cl. 214—621)

This invention comprises improvements in or relating to pallet and like trucks.

It is an object of this invention to provide means whereby pallets, stillages and the like can be lifted from ground level, transported to a place where they are to be packed which has a higher floor level, lifted thereon and then handled easily into the packed or stored position. It will be appreciated that it is quite easy with a fork-truck which is provided with a mast to lift pallets and the like to the level of, say, a tail-board of a lorry and to deposit the goods thereon, but the masted truck is not capable of moving the goods to any desired position on the lorry floor or any other similarly elevated floor. Man-handling the goods into position on the lorry or the like itself involves undue labour.

According to one feature of the present invention a pallet truck comprises a back section, pallet lifting forks which extend forwardly from the back section and carry ground rollers and means for lifting the forks relatively to the back section and rollers, characterised by the provision on the back of a hook-fitting adapted to hook on to and be lifted by an appropriate carriage on a mast of another truck.

The present invention also provides a lift-truck combination, comprising a main truck having a mast with an elevating carriage on the mast, and an auxiliary pallet truck having pallet lifting forks, said auxiliary truck being formed to interlock with and be elevated by the elevating carriage of the main truck with its pallet-lifting forks in load-carrying position, and said auxiliary truck being detachable from said carriage when elevated.

In the preferred construction hereinafter described the pallet-lifting forks of the auxiliary truck, when this truck is interlocked with the carriage of the main truck, extend forwardly away from the mast of the main truck.

The two trucks, with the first truck secured to the carriage of the mast of the second truck, can be employed as a pallet-truck to lift and transport goods, the goods can be raised on the mast to the level of the floor on which they are to be stowed, the first truck can be detached from the carriage of the mast, and used on the elevated floor to position, and deposit the goods in any desired situation. It can then be re-engaged with the carriage on the mast and used to bring a fresh load.

Preferably the first truck is attached to the carriage on the mast by a hooked connection so that lowering the carriage automatically disengages the truck with its load.

Either or both trucks may be motor propelled if desired, although normally the masted truck would be motor propelled and the truck attached to the carriage would be a hand-truck.

Figure 2:
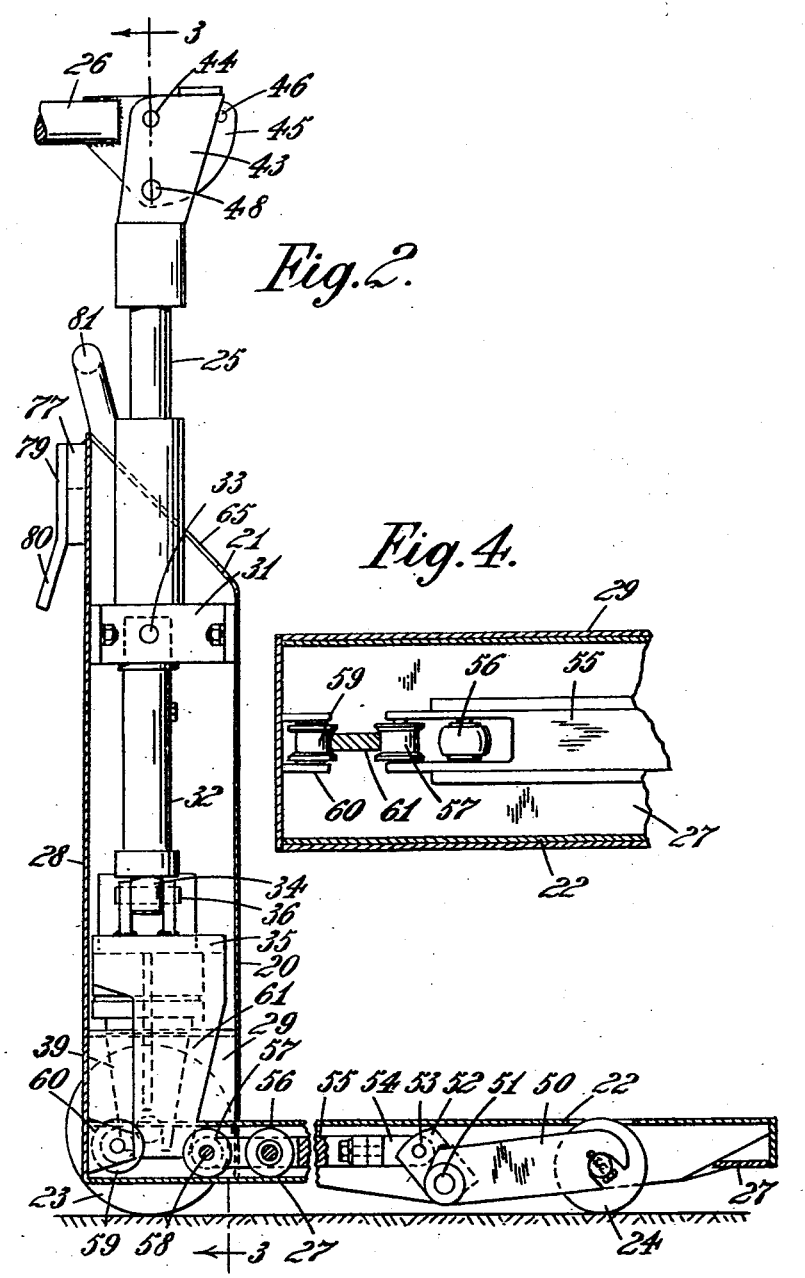
Figure 3:
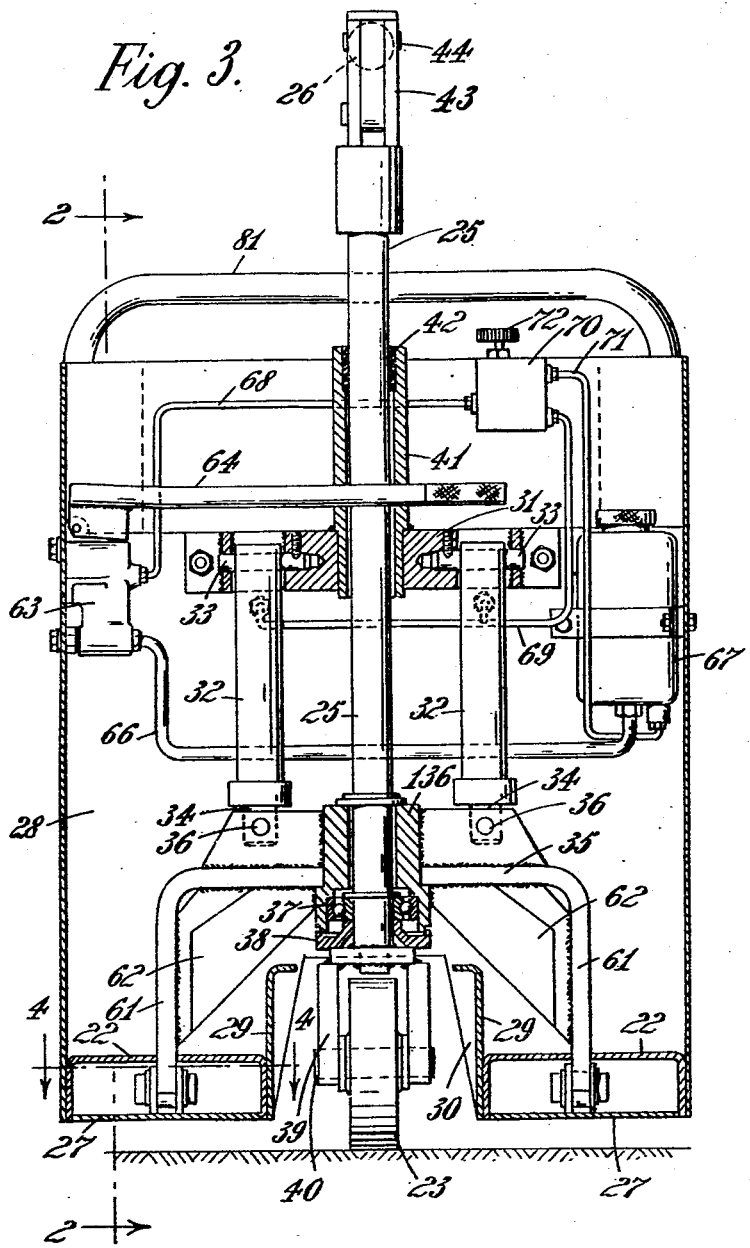

The following is a descirption by way of example of one lift-truck combination in accordance with the invention, reference being made to the accompanying drawings in which:

Figure 1 is a side elevation of a complete combination;
Figure 2 is a sectional view upon the line 2—2 of Figure 3 looking in the direction of the arrows of the auxiliary pallet-truck, showing the internal construction thereof;
Figure 3 is a section upon the line 3—3 of Figure 2 looking in the direction of the arrows;
Figure 4 is a horizontal section upon the line 4—4 of Figure 3 looking downwards on one fork arm of the truck only, and
Figures 5 and 6 are details.

Referring to Figure 1, this shows a motor-driven truck 11 having a mast 12, wheels 13, 14 and a seat 15 for the operator in front of which there is a steering wheel 16 and the usual controls. The construction of this truck is in itself well known and does not need to be further described except to say that on the mast 12 the usual lifting-carriage 17, instead of being provided with forks of the usual type is provided with a vertical-carrier-plate 18 to support an auxiliary-truck 20. The carriage 17 can be raised and lowered on the mast 12 by a hydraulic cylinder and chain in the usual way, and it may if desired be such that if the auxiliary-truck 20 is removed, ordinary fork arms can be fitted on the carriage.

The auxiliary-truck 20 is a pallet-truck which is constructed to fit on to the plate 18 and which is so made that its upright back portion 21, while containing all the fittings necessary for operating a pallet-truck, occupies a minimum of space in a fore and aft direction and the fork arms 22 of the truck can act like the forks normally fitted to the carriage 17 of the mast on lifting-fork-truck 11. The auxiliary truck 20 has a steerable central rear wheel 23 and two front rollers 24, one in each of the fork arms 22, and the truck can be lifted relatively to the wheel 23 and rollers 24 when they are resting on the ground. The wheel 23 is steered by an upright shaft 25 which carries a tiller arm 26 and the tiller arm, when the truck is to be lifted on the mast 12, can be moved upwards into line with the shaft 25 as shown in Figure 1. The construction of the truck 20 and its means of attachment to and detachment from the truck 11 will now be described.

Referring to Figures 2 and 3, it will be seen that the fork-arms 22 are made from steel plate which is bent to form an inverted channel-shaped section and is closed in as far as possible at the bottom by under-plates which give it a rectangular box-section. The fork-arms 22 are welded at their back ends to a vertical box-like sheet steel upright back portion 21 which is closed in at the back by a back-plate 28. The attachment of the fork-arms to the back-plate is strengthened by two webs 29 which extend upwards within the back 21 from the inner sides of the fork-arms 22 and which are welded to the back portion 21. It will be noted that the back-plate 28 is cut away around the wheel 23, as shown in Figure 3 at 30.

The box-like back portion of the truck contains in its upper portion a strong fixed head fitting 31 which extends across it from front to back and is bolted within the back portion 21 and to the back-plate 28. The head fitting 31 is bored to receive the upper ends of two hydraulic jacks 32 which are fixed in it by pivot pins 33 and extend downwardly. The jacks have rams 34 which are pivoted to a cross-head 35 by pins 36. The steering shaft 25 passes vertically downwards through a central boss 136 in the cross-head 35 and is supported therein by a combined ball and thrust bearing 37 below which is a dust excluding collar 38. Below the collar 38, the shaft 25 carries a fork 39 in which the steering wheel 23 of the truck is mounted on an axle 40. The head 31 has a central boss 41 in which is a bush 42 through which the shaft 25 extends and in which it is free to rotate and also to move endwise. The effect of this arrangement is that if the hydraulic jacks 32 are extended when the truck is resting on the ground, the rams 34 react against the cross-head 35 and the back 21 of the truck will be lifted relatively to the ground. This lifting movement does not interfere with steering the truck by the shaft 25 as the shaft slides through the bush 42 and is made long enough to allow for the lifting movement. On the top of the shaft 25 is a fork-member 43 in which the tiller-arm 26 is pivoted at 44. On the end of the tiller-arm which is pivoted between the arms of the fork 43 there is a quadrant-plate 45 and the quadrant-plate contains two conical centering holes 46, 47 (Figures 1 and 2) which are extended to co-operate with a spring plunger 48 (see detail Figure 6). The spring plunger centres one or other of the depressions 46, 47. When the tiller arm 26 is lowered as shown in Figure 2, the depression 47 is centred by the plunger 48 and when it is raised the depression 46 is engaged by the plunger.

It is necessary not only to raise the back of the truck on the wheel 23 but at the same time to raise the front ends of the fork-arms 22 on the rollers 24. To this end the rollers 24 are mounted on bell crank levers 50 (Figure 2) which are pivoted inside the fork-arms at 51 and carry upwardly extending arms 52 which are pivoted at 53 to a fork 54 mounted on the end of a push-rod 55 in each fork-arm. The push-rod 55 extends rearwardly along the interior of its fork-arm and it is guided at its inner end by a roller 56 which is fitted into it as shown in Figure 4. To this end the rear portion of the push-rod 55 is forked and the forks extend rearwardly far enough to support a pivot 58 for a second flanged roller 57. The flanged roller 57 is matched by another flanged roller 59 which is supported in a forked bracket 60 welded to the back-plate 28. In the space between the flanged rollers 57, 59, there works a wedge 61 which is capable, by relative lifting movement of the back portion 21, of forcing the roller 57 away from the roller 59 and thereby pushing the push-rod 55 forwardly inside the fork-arm 22 and causing it to turn the bell crank lever 50 in a clockwise direction as viewed in Figure 2 of the drawing and so to force the roller 24 downwards. There are two of the wedges 61 and they extend downwardly from the ends of the cross-head 35, the connection being stiffened by internal webs 62. The result is that when the jacks 32 are operated to react against the cross-head 35 and thereby to lift the back of the truck by their action on the wheel 23, the lifting movement causes the rollers 57 to ride up the wedges 61 and lift the front of the truck by their action on the bell cranks 50 and rollers 24. If the wedges 61 have the correct angle, the truck while lifting will keep itself horizontal.

In order to operate the hydraulic jacks 32 a hand-pump 63 is provided which is operable by a handle 64. The handle 64 is shown in Figure 3 of the drawing located inside the rear casing 21 but it can be raised through an opening 65 (Figure 2) in the top of the casing and operated to work the jacks 32 whenever desired. The pump 63 draws by a suction pipe 66 from a reservoir 67 and delivers to the jacks by means of delivery pipe 68 and distribution pipe 69. A by-pass valve 70 is provided for returning surplus oil to the reservoir 67 by way of pipes 71 if the pump should be operated beyond the point at which the jacks 32 reach the end of their stroke. The by-pass is also provided with a hand-valve 72, the opening of which will open the by-pass and relieve the pressure in the jacks, allowing the truck to be lowered.

It will be noted that all these parts are arranged in a narrow space in the casing 21 so that the truck takes up the minimum possible amount of room in a fore and aft direction.

Referring to Figures 1 and 5, these show particularly the way in which the truck 20 is detachably mounted on the carriage 17. The casing 21 of the truck 20, when the truck is resting on the ground, is somewhat higher than the upper edge of the carrier-plate 18 when the latter is in its lower-most position on the mast 12. The plate 18 has a horizontal upper edge 75 in the centre of which there is an upward projection 76 with sloping sides. On the back of the casing 21 along its upper edge is a plate 77 having a central notch 78 of the same shape as the projection 76 but deeper. Over the back of the notched plate 77 there is a guide-plate 79, the lower edge of which is bent outwardly as shown at 80 and provided with a central aperture corresponding in shape to the notch 78. It is to be noted that the notched-plate 77 extends downwardly nearly to the level of the bend in the guide-plate 79 and the notch 78 in it is quite wide at its bottom portion. If the carriage 17 of the masted truck 11 is positioned only approximately centrally below the back of the auxiliary-truck 20 and is then lifted, the tip of the upward projection 76 on the back-plate 18 will enter the notch 78 in the plate 77 and it will be guided forwardly thereinto by the sloping portion 80 of the guide-plate 79. On lifting the carriage 17, any small lack of alignment between the auxiliary truck and the main truck will be eliminated, the parts centering themselves relatively to one another. The truck 20 can be lifted to any desired height and transported in this condition by the truck 11 and then deposited, for example on a lorry floor or an elevated platform and disengaged by lowering the carriage 17. The truck 20 can then be moved about on the lorry floor or the elevated platform on its own wheels, using the tiller-handle 26 to guide it and the jacks 32 to lift it as required. After it has deposited its load it can be returned to the main truck 11, re-engaged with the carriage 17 and the two trucks moved away together. If goods are to be removed from the lorry or the lifted platform the operations are reversed in order.

In order to facilitate man-handling the truck 20, in addition to the tiller-handle 26, the back 21 carries a fixed bail-handle 81.

I claim:

1. A lift-truck combination comprising a main truck having a mast with an elevating carriage on the mast, and an auxiliary pallet truck having an upright back, pallet-lifting forks extending forwardly of the lower portion of said back, and ground wheels to support said forks close to the ground, said auxiliary truck being formed to interlock with and be elevated by the elevating carriage of the main truck with its pallet-lifting forks in load-carrying position and acting as load carrying forks for the main truck, said auxiliary truck being detachable from said carriage for separate use when desired.

2. A lift truck combination as claimed in claim 1 wherein the auxiliary truck comprises on the back portion a downwardly-opening tapered recess and the main truck has on its carriage an upwardly-pointing tapered member adapted to interfit with the recess on the auxiliary truck.

3. A lift truck combination comprising a main truck having a mast with an elevating carriage on the mast, and an auxiliary pallet truck comprising a fixed head within the upright back portion, downwardly projecting jack means secured to the fixed head, a cross head movable relative to the back portion and operated by said downwardly projecting jack means, a steerable mounting for a truck wheel on the movable crosshead and means carried by the movable crosshead within the back portion of the truck for operating rollers at the front ends of the auxiliary truck fork arms so that the rollers move downwardly when the truck wheel on the crosshead moves relatively to the back portion.

4. A combination as claimed in claim 3, wherein the movable cross-head carries wedge-members for operating push-rods extending along the fork-arms to move the rollers.

5. A truck combination as claimed in claim 4, wherein the fixed head carries a guide for vertically moving steering shaft secured to the steerable mounting at the truck wheel and the guide serves to allow both rotational and longitudinal movements of the steering shaft.

6. A combination as claimed in claim 3, wherein the hollow back of the auxiliary truck contains a hand-pump and the jack means are hydraulically operable by the hand-pump.

7. A construction as claimed in claim 3, wherein the steering member of the auxiliary truck carries a tiller-arm pivoted to it and capable of assuming two positions, one in which it is extended longitudinally relatively to the truck for steering purposes and the other in which it is stowed substantially vertically.

8. A pallet truck comprising an upright back, the rear face of which forms the back surface of the truck, the ground wheel or wheels therefor, pallet-lifting forks, ground rollers thereon, a lifting mechanism for the forks relatively to the back and ground rollers, the back carrying also a fitting adapted to hook on to and be lifted by an appropriate carriage on a mast of another truck.

9. A pallet truck comprising a hollow upright back portion, fork arms projecting forwardly therefrom, a fixed head within the hollow portion, downwardly projecting jack means secured to the fixed head, a cross-head movable relative to the hollow portion and operated by said downwardly projecting jack means, a steerable mounting for a truck wheel on the movable cross-head, wedge members carried by the movable cross-head within the back portion of the truck for operating push rods extending along the fork arms to move rollers at the front ends of the fork arms so that the rollers move downwardly when the truck wheel on the cross-head moves relatively to the back portion and a fitting on the hollow back adapted to hook onto and be lifted by an appropriate carriage on a mast of another truck.

10. A pallet truck as claimed in claim 9, wherein the fixed head carries a guide for vertically moving steering shaft secured to the steerable mounting at the truck wheel and the guide serves to allow both rotational and longitudinal movements of the steering shaft.

11. A pallet truck as claimed in claim 9, wherein the hollow back of the auxiliary truck contains a hand-pump and the jack means are hydraulically operable by the hand-pump.

12. A pallet truck as claimed in claim 9, wherein the steering member of the auxiliary truck carries a tiller-arm pivoted to it and capable of assuming two positions, one in which it is extended longitudinally relatively to the truck for steering purposes and the other in which it is stowed substantially vertically.

References Cited in the file of this patent

UNITED STATES PATENTS

| | | |
|---|---|---|
| 2,422,538 | Framheim | June 17, 1947 |
| 2,441,750 | Britton | May 18, 1948 |
| 2,601,163 | Miller | June 17, 1952 |
| 2,629,507 | Olson | Feb. 24, 1953 |
| 2,647,647 | Alimanestiano | Aug. 4, 1953 |
| 2,676,720 | Noble | Apr. 27, 1954 |
| 2,681,202 | Germond | June 15, 1954 |
| 2,685,972 | Eisenhard et al. | Aug. 10, 1954 |
| 2,706,569 | Butler | Apr. 19, 1955 |

FOREIGN PATENTS

| | | |
|---|---|---|
| 529,605 | Great Britain | Nov. 25, 1940 |